(12) United States Patent
Howe

(10) Patent No.: US 12,038,030 B2
(45) Date of Patent: Jul. 16, 2024

(54) FIXING DEVICE

(71) Applicant: Bullfix Ltd., Warwick (GB)

(72) Inventor: Mark Howe, Edwinstowe (GB)

(73) Assignee: Bullfix Ltd., Warwick (GB)

( * ) Notice: Subject to any disclaimer, the term of this patent is extended or adjusted under 35 U.S.C. 154(b) by 196 days.

(21) Appl. No.: 17/755,615

(22) PCT Filed: Nov. 2, 2020

(86) PCT No.: PCT/GB2020/052771
§ 371 (c)(1),
(2) Date: May 3, 2022

(87) PCT Pub. No.: WO2021/089991
PCT Pub. Date: May 14, 2021

(65) Prior Publication Data
US 2022/0381279 A1    Dec. 1, 2022

(30) Foreign Application Priority Data

Nov. 4, 2019 (GB) ..................................... 1915976
Aug. 21, 2020 (GB) ..................................... 2013127

(51) Int. Cl.
*F16B 21/00* (2006.01)
*F16B 13/08* (2006.01)

(52) U.S. Cl.
CPC .............................. *F16B 13/0808* (2013.01)

(58) Field of Classification Search
CPC ....... F16B 13/08; F16B 13/0808; F16B 13/04
(Continued)

(56) References Cited

U.S. PATENT DOCUMENTS 532,187 A * 1/1895 Rubenstein
507,115 A * 9/1896 Atkinson
(Continued)

*Primary Examiner* — Gary W Estremsky
(74) *Attorney, Agent, or Firm* — UltimatEdge IP Law Group, P.C.; Dean G. Stathakis

(57) ABSTRACT

A fixing device 101 has a pair of complementary fingers 102,103 complementary pivot formations 121,122. Each has distal portion 104 and a proximal portion 105. Both have a flat surface 106, which abuts the same face in the other finger, both at the distal portions when the fixing is arranged for insertion in an aperture 107 in a board 108 and at the proximal portions when the fingers are arranged both for insertion and gripping of the board.
The distal portions each have a surface 111 with an edge 1112 common with the surface 106. This surface 111 comes into abutment with the back face 112 of the board 108. The proximal portion is generally hemispherical to allow rotation within the aperture 107. A lug portion 1161 generally in the direction of the distal portion 104.
FIXING DEVICE A fixing device 101 has a pair of complementary fingers 102,103 complementary pivot formations 121,122. Each has distal portion 104 and a proximal portion 105. Both have a flat surface 106, which abuts the same face in the other finger, both at the distal portions when the fixing is arranged for insertion in an aperture 107 in a board 108 and at the proximal portions when the fingers are arranged both for insertion and gripping of the board. The distal portions each have a surface 111 with an edge 1112 common with the surface 106. This surface 111 comes into abutment with the back face 112 of the board 108. The proximal portion is generally hemispherical to allow rotation within the aperture 107. A lug portion 1161 generally in the direction of the distal portion 104. With the fingers engaged and their distal portions brought as close to alignment as possible, the Tee projections 114 abut the flanges 109 at angled faces 135. The contours of the fingers are such that they can be inserted into the aperture 107 until the distal portions 104 enter the aperture.
Passage of these through the aperture is inhibited by the lugs 1161, specifically by abutment of the angled back surface 118. Pressure on the angular relief surfaces 120 of the abutments 1162 urges the lugs into the front face 135 of the board 108. The reaction of the board acts about the pivot centrally of the aperture, tending to turn the fingers about the lugs under the constraint that they are pivoted together. The fingers are turned with the distal portions coming to lie on the backside of the board. This allows the fastener 130, typically a self-tapping screw to be inserted between the complementary recesses 134, where they open in the outer surfaces 117.

18 Claims, 18 Drawing Sheets

Figure 1:
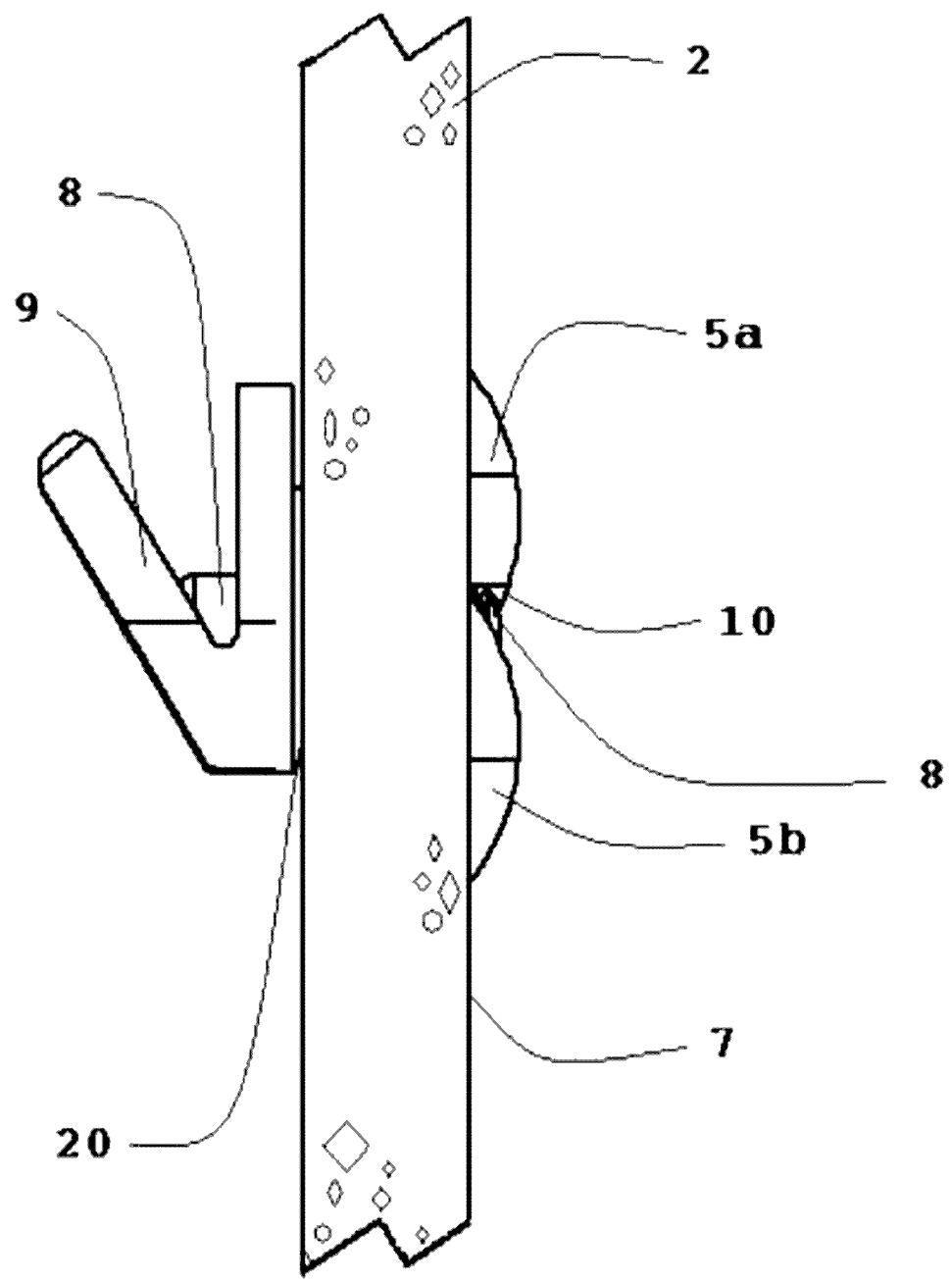

(58) Field of Classification Search
USPC .......................................... 411/340, 344, 345
See application file for complete search history.

(56) References Cited

U.S. PATENT DOCUMENTS

| | | | |
|---|---|---|---|
| 726,636 A * | 4/1903 | Carll | |
| 767,641 A * | 4/1904 | Saunders | |
| 736,636 A * | 4/1908 | Carll | |
| 1,504,147 A * | 8/1924 | Rudolph | F16L 37/1235 |
| | | | 285/8 |
| 2,013,503 A * | 9/1935 | Pleister | F16B 13/0808 |
| | | | 411/346 |
| 2,061,634 A * | 11/1936 | Pleister | F16B 13/0808 |
| | | | 411/342 |
| 2,248,238 A * | 7/1941 | Hooper | F16L 55/136 |
| | | | 285/8 |
| 4,065,833 A * | 1/1978 | Bender | F16G 15/00 |
| | | | 24/598.5 |
| 7,143,485 B2 * | 12/2006 | Kanie | F16B 37/0842 |
| | | | 24/297 |
| 8,424,173 B2 * | 4/2013 | Shiba | F16B 5/065 |
| | | | 24/297 |
| 9,757,164 B2 * | 9/2017 | Hess | A61B 17/7065 |
| 2008/0080948 A1 * | 4/2008 | Barclay De Tolly | ........................ |
| | | | F16B 13/0808 |
| | | | 411/340 |
| 2014/0154028 A1 * | 6/2014 | Pei | F16B 13/0808 |
| | | | 411/345 |

* cited by examiner

SECTION A-A

FIXING DEVICE

This application is a 35 U.S.C. § 371 U.S. national stage patent application which claims the benefit of priority and is entitled to the filing date of International Patent Application PCT/GB2020/052771, filed Nov. 2, 2020, an application that claims the benefit of priority and is entitled to the filing date of GB Patent Application 2013127.2, filed Aug. 21, 2020, and GB Patent Application 1915976.3, filed Nov. 4, 2019, the content of each of which is hereby incorporated by reference in its entirety.

The present invention relates to a fixing device for use with a fastener in making a fixture to a board from a front side of the board at an aperture.

Many fixing devices for use with a fastener in making a fixture exist from a piece of wood inserted in a hole formed in a brick wall. The previously widely used fibrous material fixing was that sold under the Rawplug registered trade mark. These have been superseded by plastics material plugs. Whilst these can be used in plaster board, they are not ideal because of the lack of thickness of the board. Plugs do exist, which have fingers expanding radially when drawn against the board. Other proposals are made in US 2003/0108397, whose abstract is as follows:

The invention relates to an expansible anchor (10) for fastening to a panel-shaped building material, having an anchor sleeve (12) with forwardly projecting expansion tongues (18) that can be spread open by drawing in an expander body (24) having an expander cone (24). The invention proposes to form the expansible anchor (10) with a locking connection (20, 36) which locks the expander body (24) on the expansible anchor (10) in a position in which the expander body (24) is drawn in between the expansion tongues (18) and holds the expansion tongues (18) in a spread-open position. The invention has the advantage that the expander body (24) remains in its position in which it is drawn in between the expansion tongues (18) and holds the expansion tongues in a spread-open position even when an expander screw is unscrewed from the expansible anchor (10).

Figure 4:
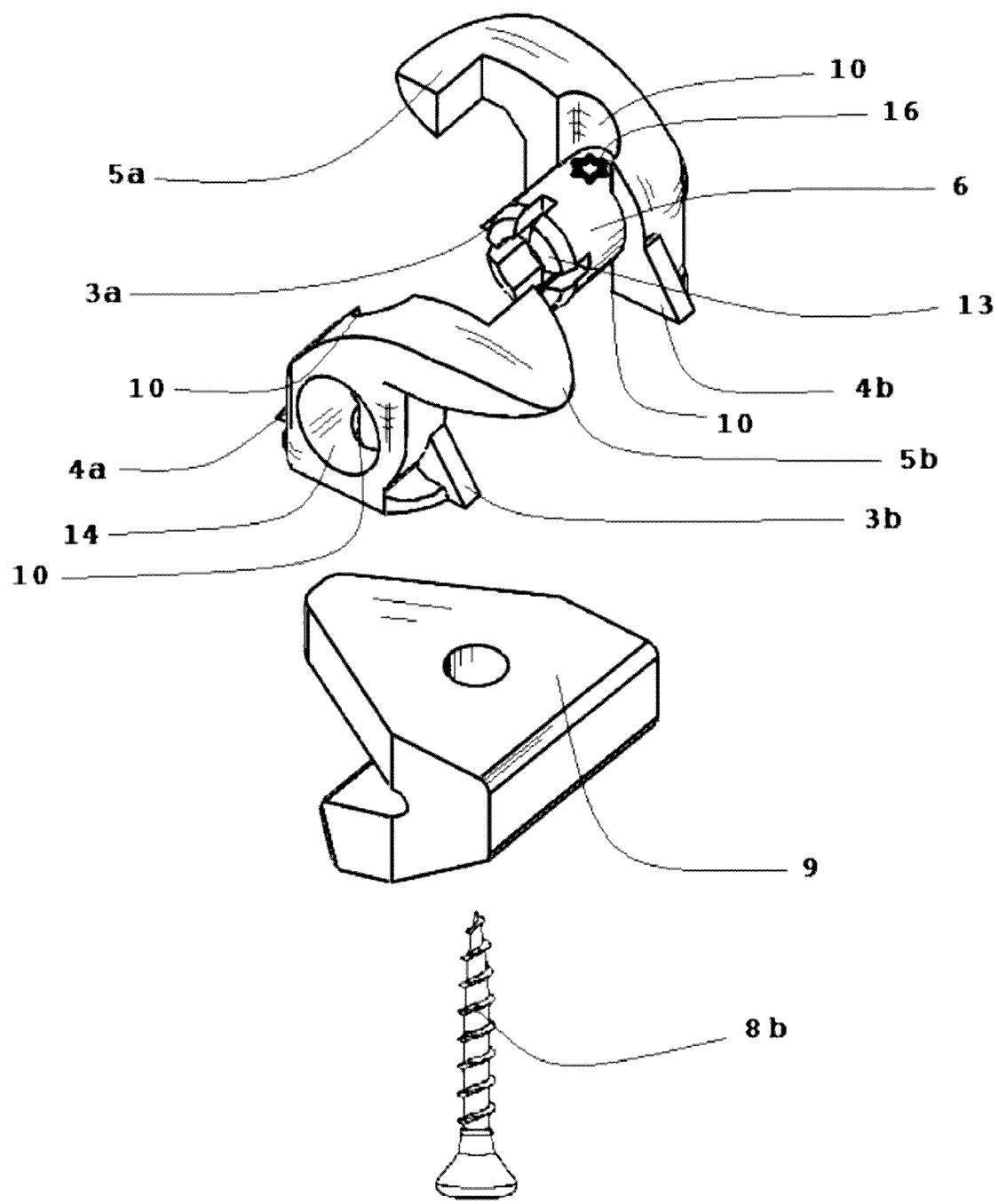
Figure 5:
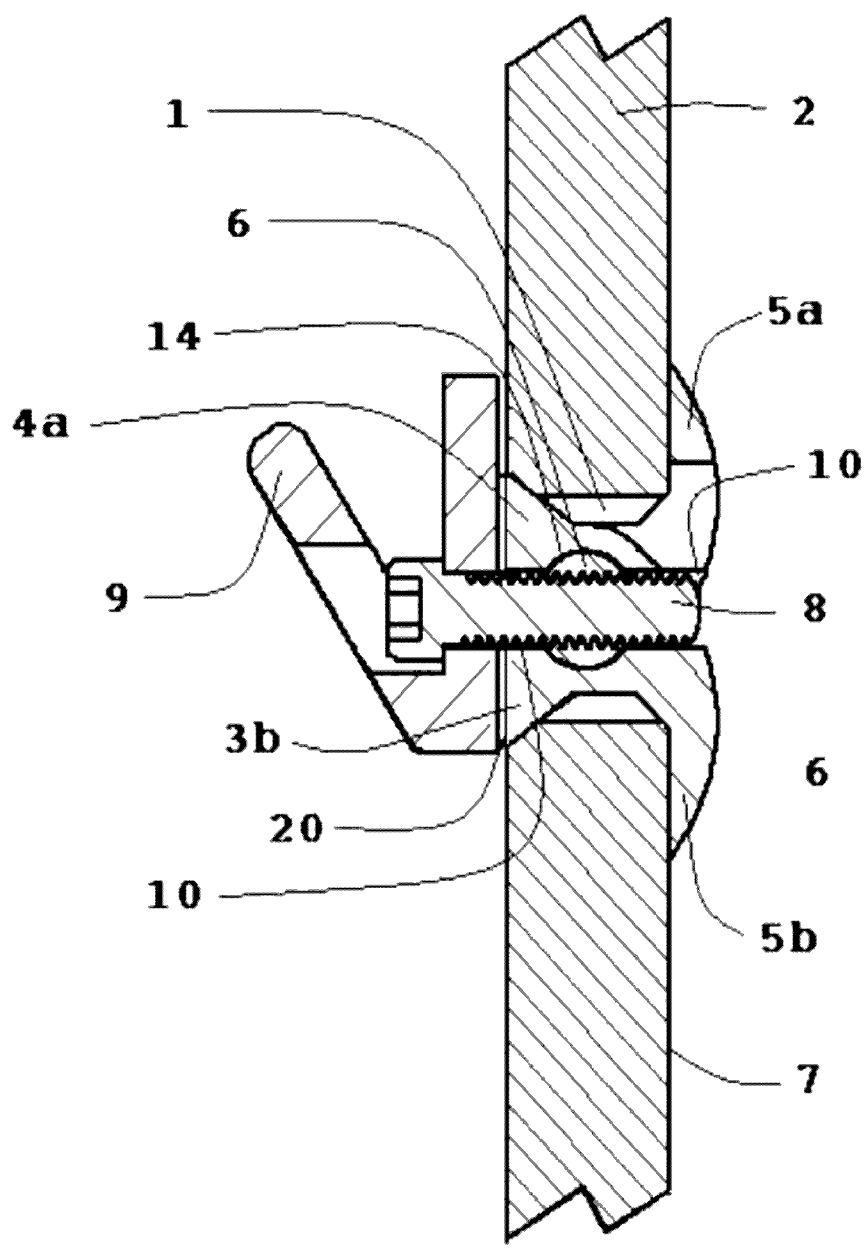
Figure 6:
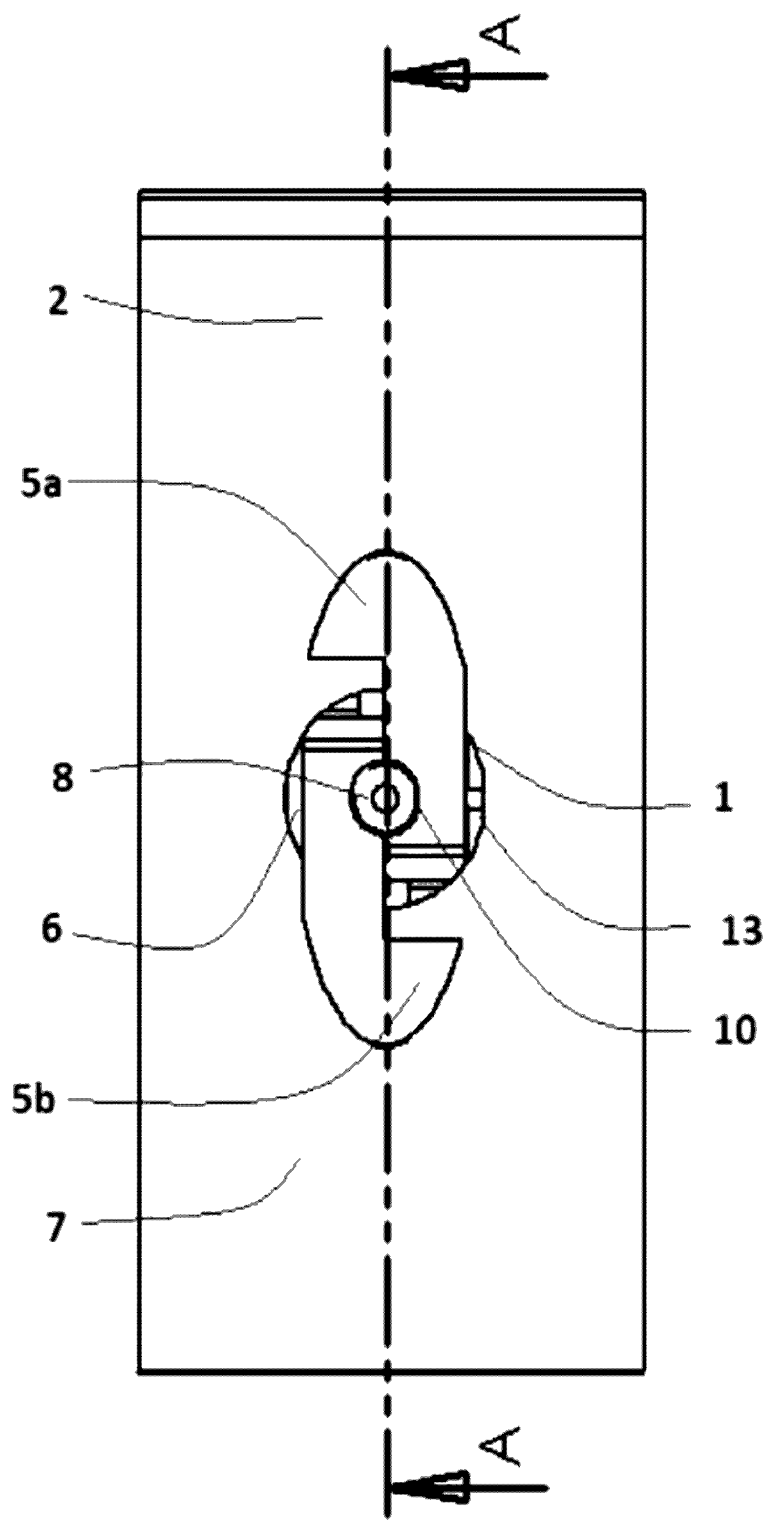

Again there is U.S. Pat. No. 6,004,088, whose abstract is as follows:

This invention is a wall fastener to join abutting surfaces such as affixing a bracket to a wall. The L-shape arms of the fastener are attached with hinges to a shell or to a slidable nut enclosed in a shell which is inserted in a preformed hole or aperture in the wall. The fastener with arms attached to the slidable nut is adjustable for use with walls of varying widths. A screw holding the object to be attached is inserted in the shell and threaded through the nut (FIG. 4). The screw then engages the arms of the fastener and forces them to pivot into a clamping position (FIG. 5). The screw is turned until the arms are clamped against the wall (FIG. 6). The fastener with the arms attached to the shell is similar in operation to the adjustable fastener except its use is for walls or surfaces of the same width as the device.

Both of these rely for their board gripping expansion on insertion of their fastener. This makes for considerable length behind the board, which in turn is inconvenient when the fixture is to be made to plaster board closely spaced from a brick wall close behind.

More generally, most plasterboard anchor fixings are a two-stage that have to first travel axially through a pre-made hole to a substantial depth past the rear surface of the plasterboard and secondly part of the fixing is made to mechanically expand radially at the rear of the plasterboard to a greater diameter than the pre-made hole by mechanically activated further by rotating a screw or bolt to expand the fixing radially at the rear of the plasterboard or using a special installation tool, this further increase the installation time of the fixing. Additionally, most of the current products on the market are complicated with several parts which increases the cost of production. If the plasterboard is adhered to a wall using batons or dabs of adhesive the cavity depth restricts the implement of using many of these types of fixings as most of the current fixings are required to travel substantially past the rear of the plasterboard.

A one piece plastics moulding fixing device is sold under the RocLoc name (FastCap, LLC, Ferndale, WA.). It is L-shaped with the leg of the L intended to be inserted through a board and the foot of the L occupying a hole in the board. The foot has a lower rib, directed away from the leg, which tapers and is deeper at the distal end of the foot. A lip crosses the distal end of the rib at the distal end of the foot. On insertion, the rib urges the top of the foot against the hole causing the leg to rotate against the inside of the board, with the lip pressed against the board. Fixing is effected with a screw inserted in a bore in the foot.

The object of the present invention is to provide an improved fixing device.

As originally conceived, the current invention overcomes several of the problems with current designs by allowing the fixing device to be made by inserting two or more contra-rotating and opposing 90 degree fingers that when pressed axially into a pre-made hole within the plasterboard engage a lug on the front circumference of the pre-made hole in the plasterboard that force rotation radially of each 90 degree finger to follow an arc expanding from within the pre-made hole to expand radially to a much greater diametrical width when it passes the rear of the pre-made hole but only protruding a small distance past the rear surface of the plasterboard axially where a further lug prevents each finger travelling past the front surface of the plasterboard; they are then mechanically locked together once a screw or bolt is inserted into the fingers at the same time as attaching an article to the anchor point; these fingers can be placed sequentially one at a time or simultaneously together and are pressed into place using the flat surface of a tool such as a mallet for example.

More broadly, according to the invention there is provided a fixing device for use with a fastener in making a fixture to a board from a front side of the board at an aperture therein, the fixture device comprising:
  a complementary pair of fingers, each finger having:
    a distal portion configured for insertion through the board aperture simultaneously or sequentially with the distal portion of the other of the two fingers and
    a proximal portion configured for insertion likewise simultaneously or sequentially and rotation of the proximal portions in the aperture,
  a lug on one or both of the proximal portions, spaced from and projecting in the general direction of the respective distal portion, for engaging a front of the board on initial proximal portion insertion, with rotation on further insertion, whereby the distal portions abut against a back of the board and
  a fastener receptacle formed in one or both of the proximal portions or formed in a separate member engageable therewith,
the arrangement being such that:
  on insertion and rotation of the fingers, a fastener can be received in the fastener receptacle and on tightening of the fastener, the distal portions are urged to abut against the back of the board and the fixed article can be drawn by the fastener against the front of the board.

The invention finds particular use with in providing an anchoring point in plasterboard cavity walls or ceilings for the purpose of affixing other articles thereto. However, it is envisaged to have other uses as well.

The insertion and rotation of the fingers, followed by reception of the fastener and its tightening allows use of a fastener for tightening only and not the rotation of the fingers. Indeed the rotation is a function of movement of the proximal portions into the aperture and not its oppositely directed action on tightening of the fastener. Nevertheless where the receptacle is provided at least partially in both fingers, insertion of the screw can assist in final rotation to their board abutment position of the fingers.

The fingers can be formed for sequential insertion in which case:
  the fingers can be formed for sequential insertion and have rotational symmetry about the fastener receptacle formed as grooves in abutting diametric surfaces at their proximal portions, whereby one finger is insertable for lug induced rotation followed by the second finger passing alongside the first, with the grooves aligning to form the fastener receptacle on rotation of the fingers for the distal portions to abut the back of the board.

Alternatively:
  the fingers can be formed for sequential insertion with the second to be inserted:
    being bifurcated with two distal portion parts adapted to pass on both sides of the proximal portion of the first inserted finger, and
    having a web between the bifurcated parts at the proximal portion of the second to be inserted finger and
    the first to be inserted finger having a recess at the proximal portion thereof sized to be abutted by the web of the second to be inserted finger.

Again in another alternative:
  the fingers are formed for sequential insertion, with the distal portion of the second to be inserted finger being sized to pass through an opening in the proximal portion of the first to be inserted finger.

In this alternative, preferably, the proximal portion of the first to be inserted finger is a ring for passage of the distal portion of the second to be inserted finger, the distal portion of the latter fitting within the ring of the former.

Both fingers can have a said lug on their proximal portion. Alternatively the finger having the said lug has an abutment for distal portion of the other finger for rotation of the finger to bear against the back of the board.

In any case, with the fingers formed for sequential insertion, preferably: the first inserted finger has at its proximal portion a fastener receptacle member, or an integral fastener receptacle part, arranged to bear on the proximal portion of the second inserted finger.

Alternatively to sequential insertion, the fingers can be formed for simultaneous insertion, in which case preferably:
  each finger has at it proximal portion a pivot formation defining a pivot axis about which the fingers are rotatable when, prior to insertion, they are engaged together for use and preferably
    both fingers have a said lug on their proximal portion.

With the fingers having pivot formations, either:
  the pivot formations of the two fingers are identical and the fastener receptacle member has complementary pivot formations; or
  the pivot formations of the fingers comprise the fastener receptacle part and pivot pin integral with one of the fingers and a complementary formation of the other finger, in which case preferably:
    the fastener receptacle part extends from a central diametric surface of the one finger, which surface is complementary with a like surface in the other finger, the diametric surfaces having grooves aligned with the fastener receptacle when the fingers are at their board back engaging mutual angle, whereby the grooves extend the fastener receptacle and, preferably:
      the pivot pin has a transverse head and the complementary formation has a slot for the transverse head to pass through at an angle of the fingers different from their insertion mutual angle and their board back mutual angle.

Preferably:
  each finger comprises an abutment extending oppositely from its lug away from its distal portion direction, the arrangement being such that on tightening of the fastener it or an article held by it abuts the abutments causing the fingers to be urged towards the back face of the board, in which case preferably:
    the abutments include flats abutted by the fastener or the article; and
  the lugs and the abutments where provided are or include angled features intended to indent the board in use.

In accordance with a particular preferred feature, the fixing device includes a sleeve sized for the distal portions to pass through and to receive the inserted, proximal portions, the sleeve having:
  one or more opening extending from an end of the sleeve for receiving the or each lug and
  one or more respective stops in the openings, spaced from the end of the sleeve,
the arrangement such being that:
  for a relatively thin board, tightening of the fastener draws the distal portions against the back of the board and the lug or lugs and the abutments where provided against the front of the board, without the or each lug received in a respective opening contacting a respective stop and
  for a relatively thick board, having a thickness greater than the distal portion to lug spacing, the or each lug can be pressed below the front of the board and against a respective stop or stops in the openings for drawing of the distal portions against the back of the board.

In this case, preferably, the sleeve has a rim for abutting the front face of the board and/or external ribs for engaging the board in the aperture.

In one embodiment of the invention, which has increased speed of installation utilising the simultaneous insertion of two fingers rather than sequential rotation of two fingers, two opposing rotational 90 degree fingers have a hole in one finger to accommodate a central hub attached to the other finger. The fingers are allowed to contra-rotate freely around each other and can be held together using a spring barbed pushed fit formed at the end of the hub. The hub can be an integral part of one of the fingers which allows a threaded hole or star shaped aperture within the hub to align correctly when the fixing in installed and pressed into the pre-made hole fully. The finger with the hole can be attached to the hub and held mechanically by a plurality of one way spring retaining fingers for example formed at the end of the hub but not restricted to this method as other methods of retaining the finger such as a plastic or metal welded washer attached to the hub to retain the second finger or retaining screw could be used. The fixing in a closed contracted state during the process of been pressed into a pre-formed hole in plasterboard will simultaneously engage lugs attached to the fingers with the front surface of the plasterboard to cause the rotation of the 90 degree fingers that will travel simultaneously axially and radially following a curved trajectory path slightly past the rear of the plasterboard but much greater than the diameter of the pre-made hole.

The fingers travel only a short distance past the rear of the plasterboard making it suitable for where there is only a small cavity behind the rear of the plasterboard. The fixing utilises the maximum space within the plasterboard thickness to allow the fingers to start mechanically expanding from opposing sides of the pre-made hole has it is pressed into the plasterboard. The fingers are shaped in such a way as to allow only a small protrusion of the fingers past the rear of the plasterboard as they follow a curved trajectory at any one time and then lock behind the rear of the plasterboard as the flat side of the fingers meets parallel to the rear of the plasterboard surface. Two further lugs on the fingers engage with the front surface to prevent the fingers travelling straight through the plasterboard along with a semi-circular flat flange formed on each finger. These lugs also prevent rotation of the fixing when tightening of a bolt or screw into the fixing. The fixing dimensions would be made to fit various thicknesses of plasterboard as there is only a small number of standard plasterboard thickness sizes on the market worldwide. The fixing can also be made to suit a wide range of pre-made fixing holes.

The fixing is a low part count fixing that can be made from predominately moulded plastic, metal or resin but is not restricted to such materials. This fixing also travels only a short distance axially past the rear of the plasterboard making it suitable for where there is only a small cavity behind the rear of the plasterboard. The fixing utilises the space within the plasterboard thickness to allow it to start mechanically expanding as it's pressed into the hole.

The fixing is further strengthened when a bolt or screw is used to attach an object to the fixing and tightened between the fingers and through the central hub. This mechanically locks all the parts together and prevents any further rotation of the fingers in either direction as the fingers contain semi-circular groves that align only in one rotational position when the fingers are fully extended to accommodate the bolt or screw.

Figure 2:
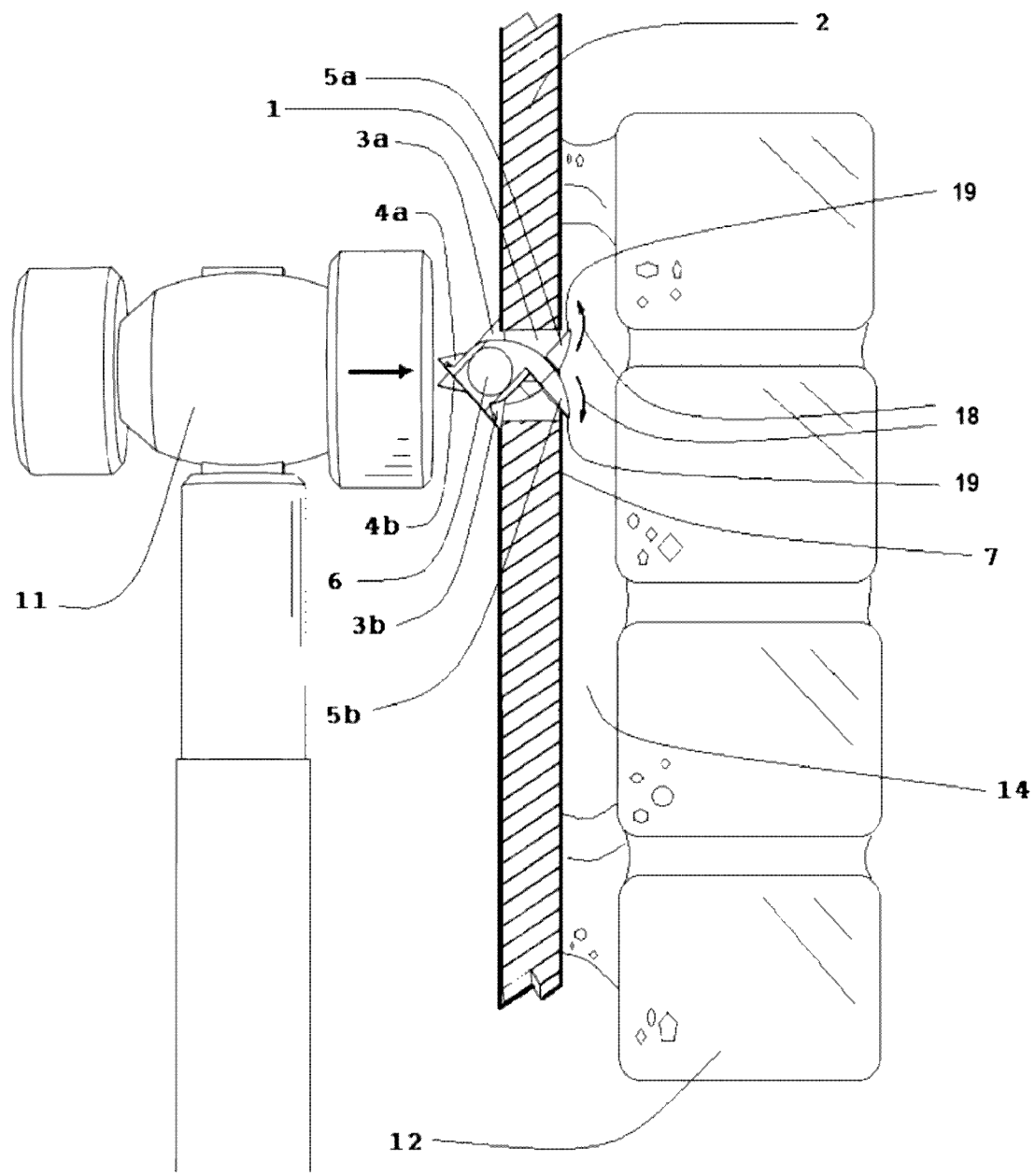
Figure 3:
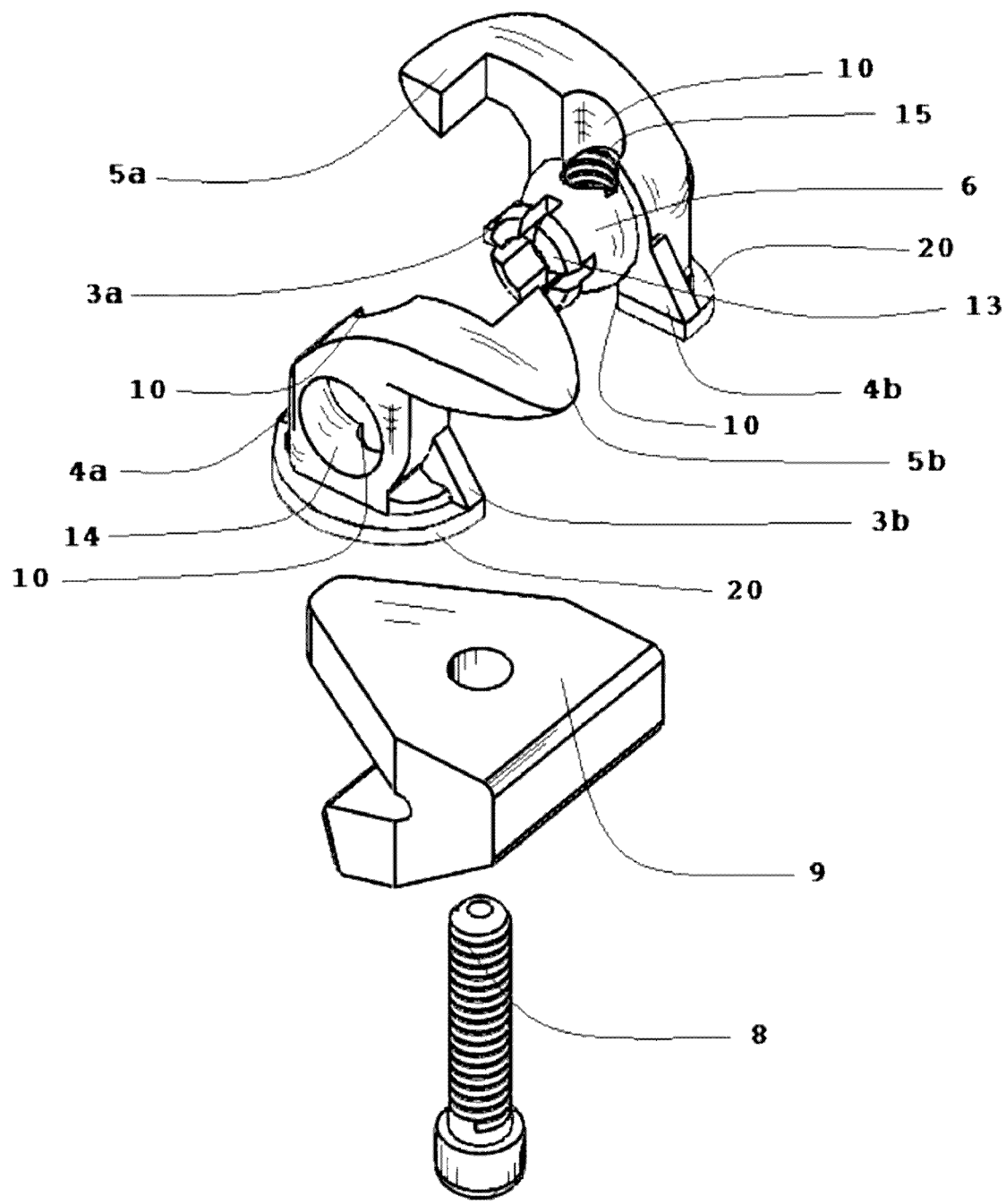
Figure 7:
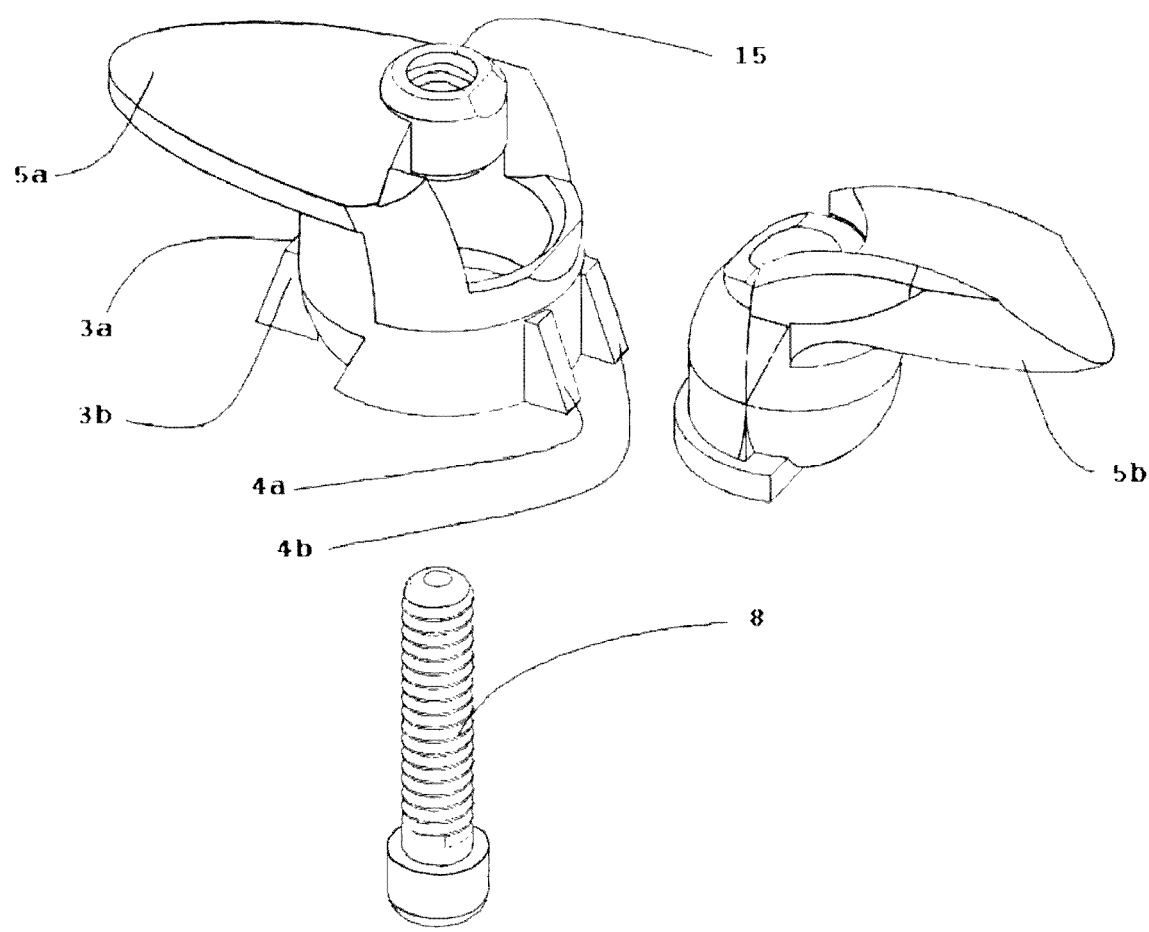
Figure 8:
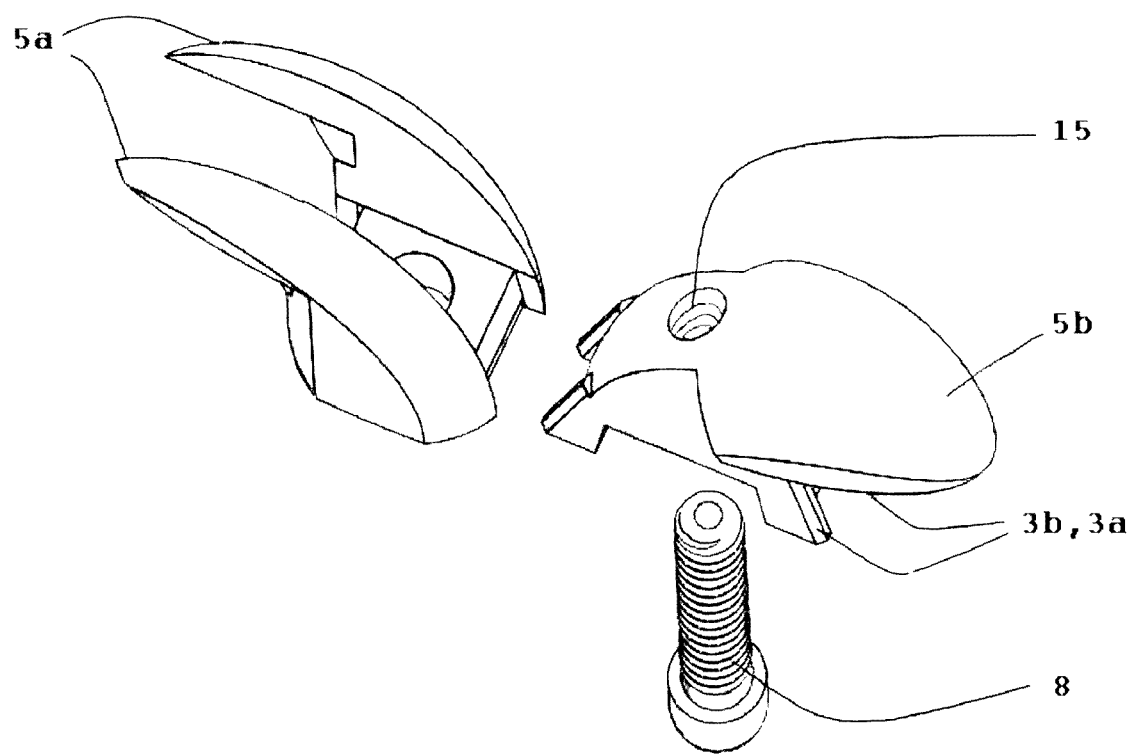
Figure 9:
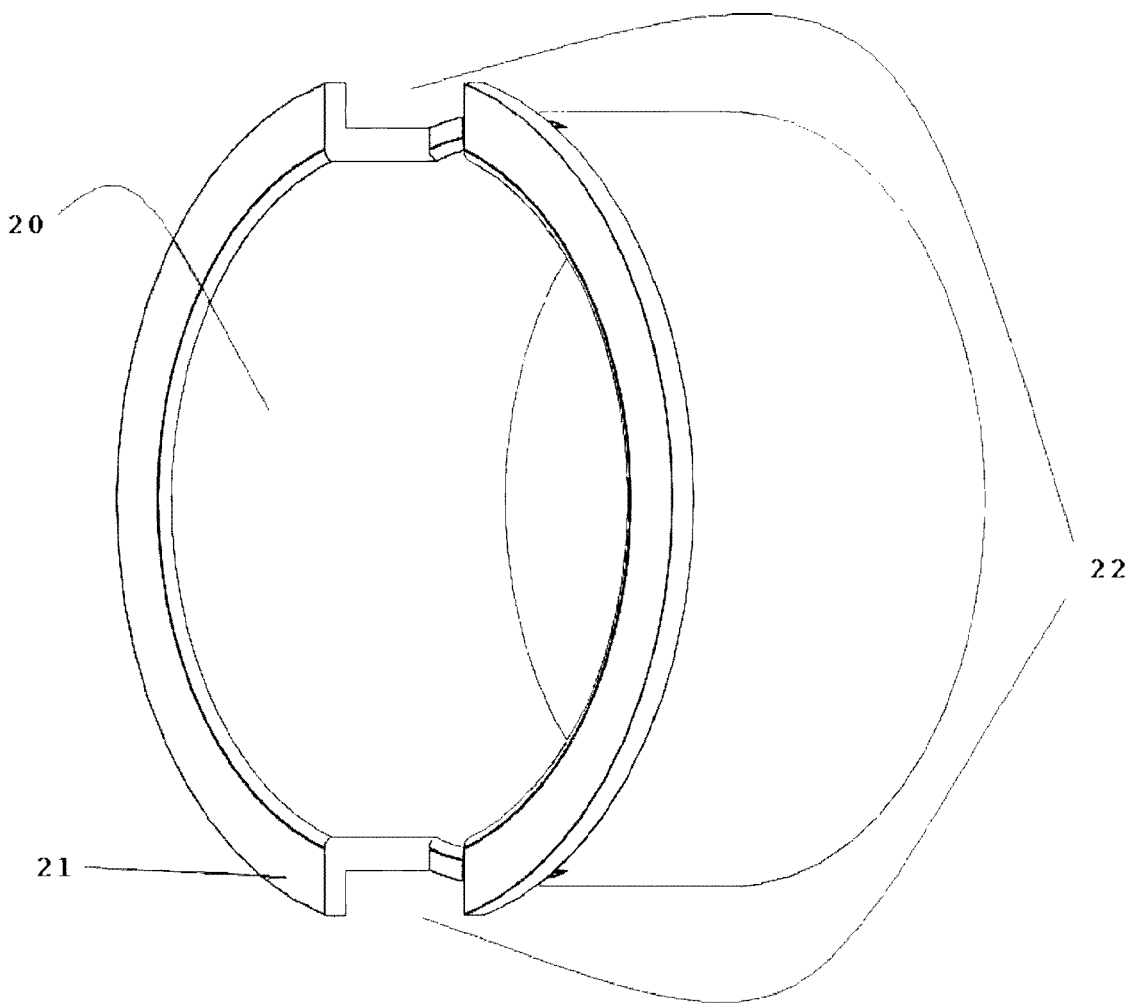
Figure 10:
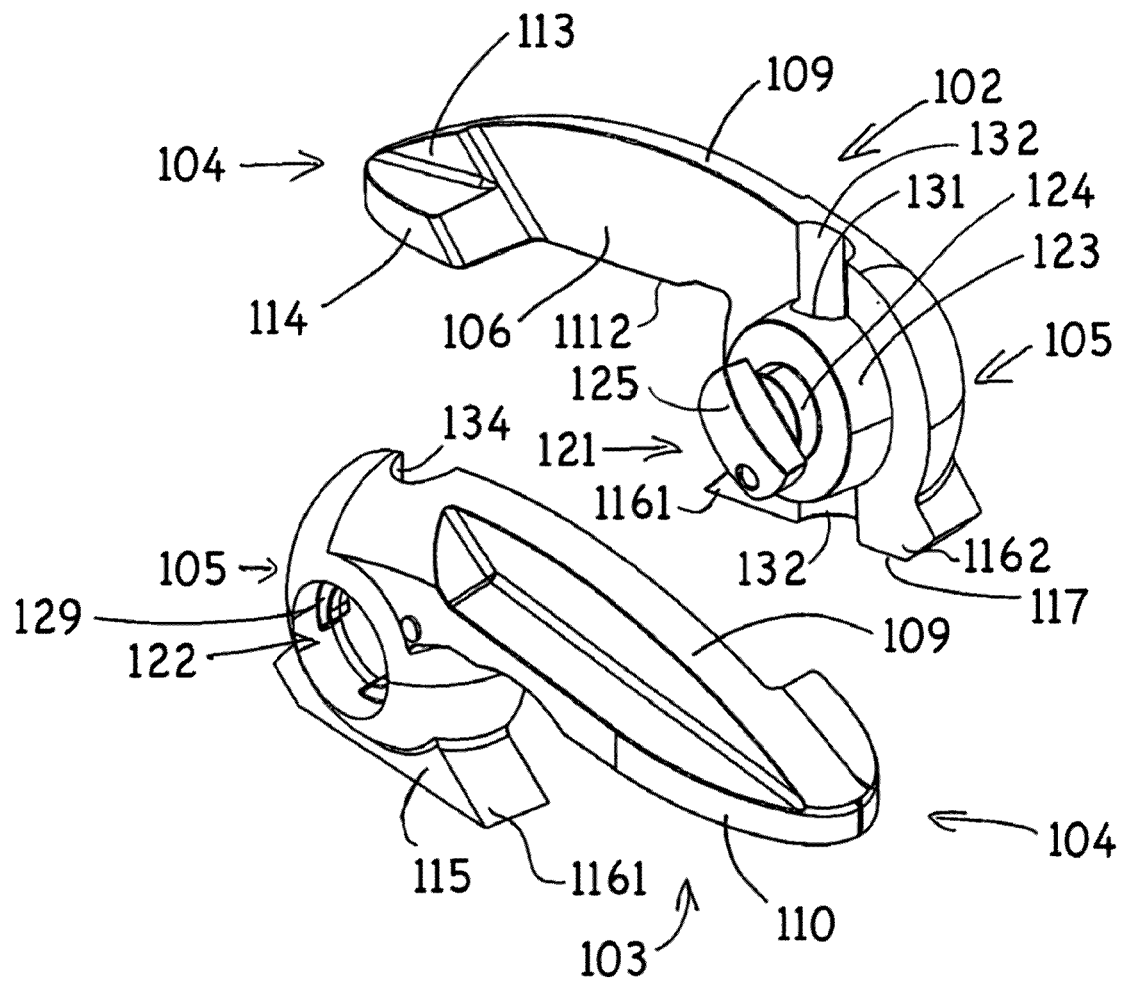
Figure 11:
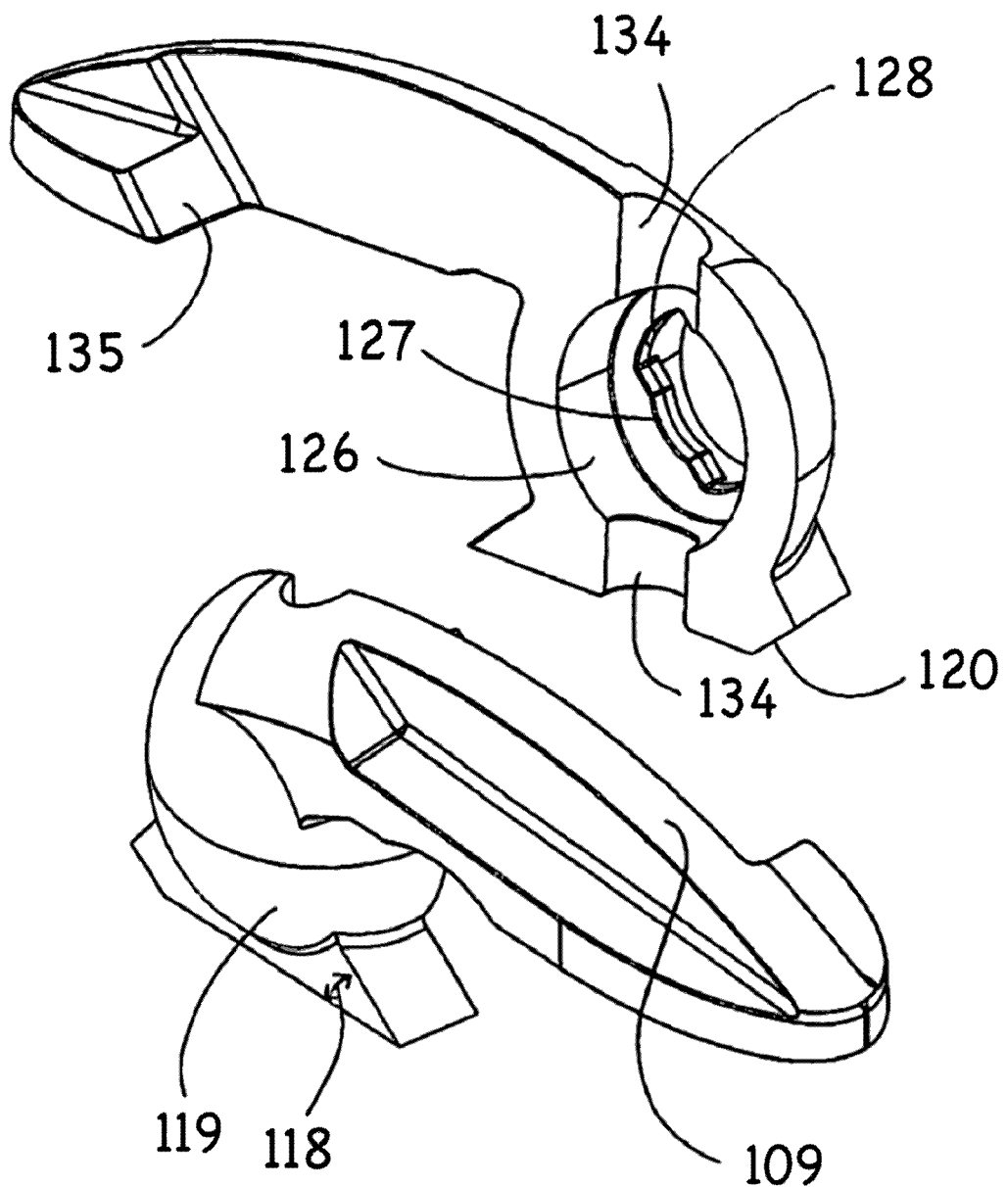
Figure 12:
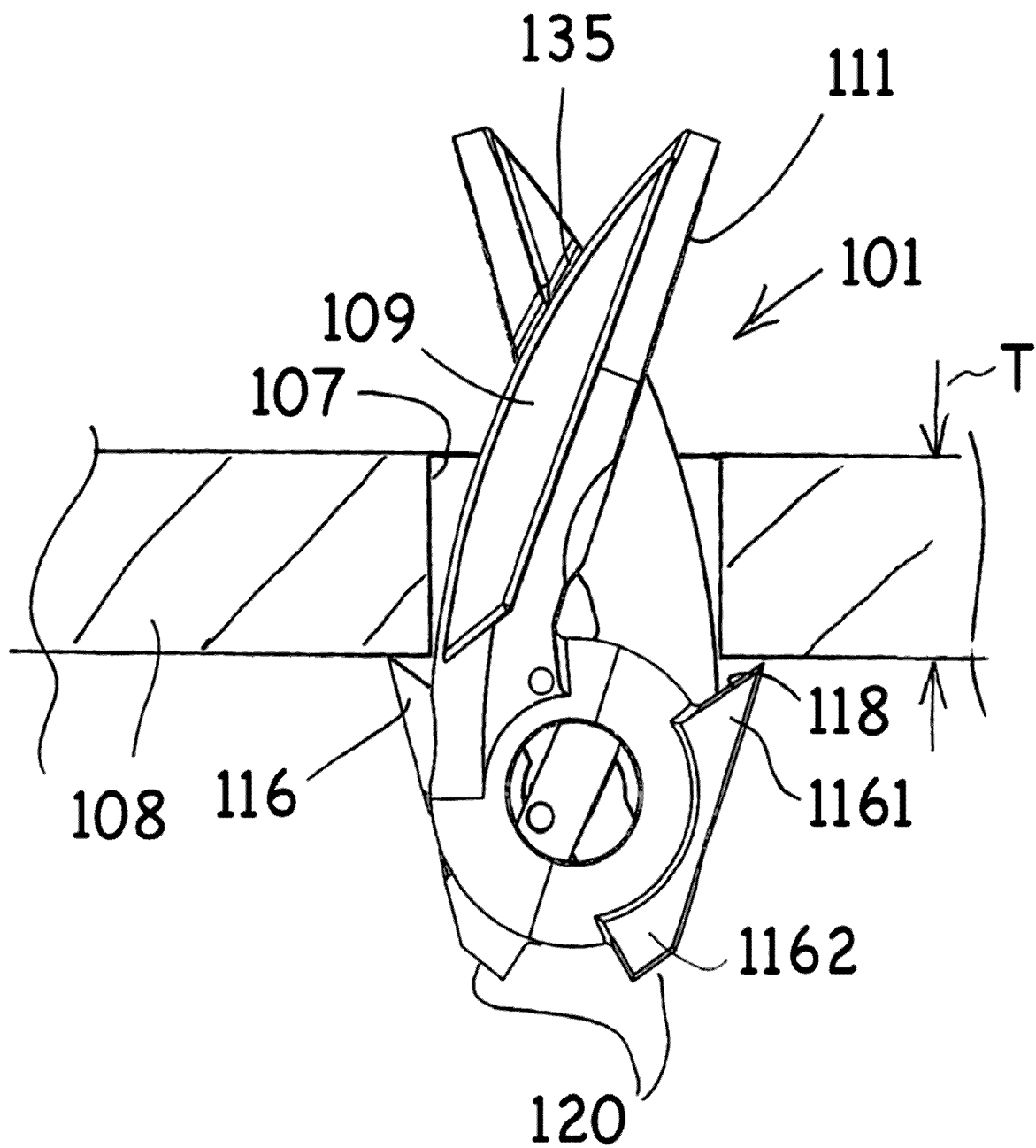
Figure 13:
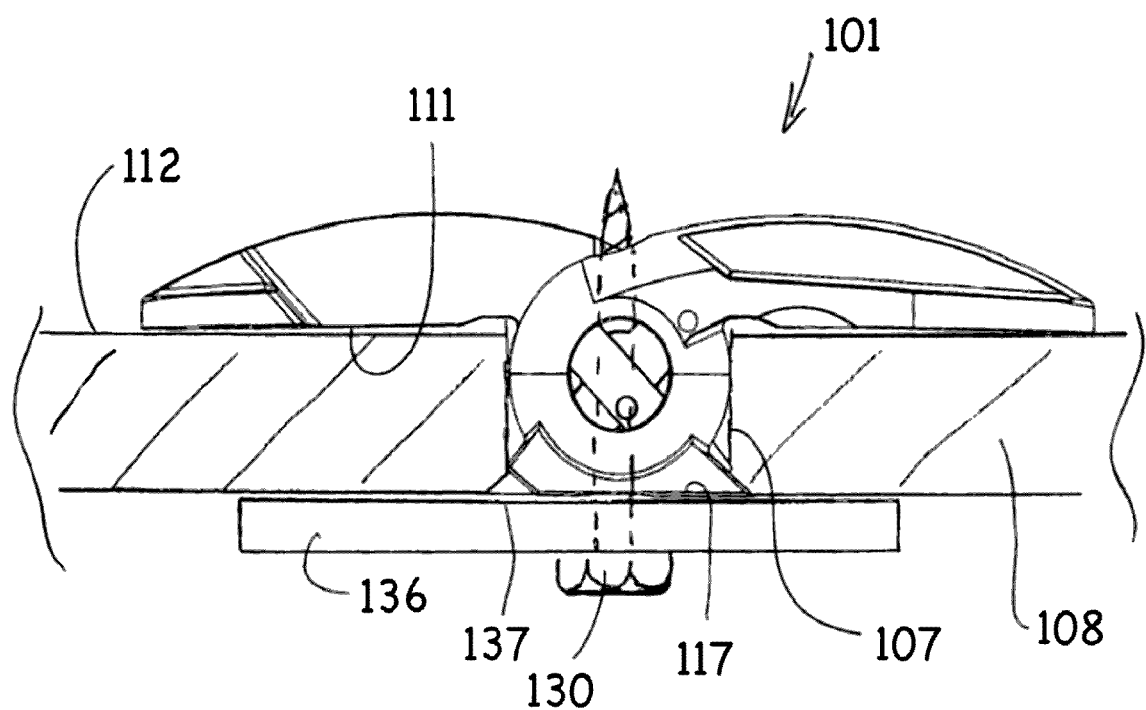
Figure 14:
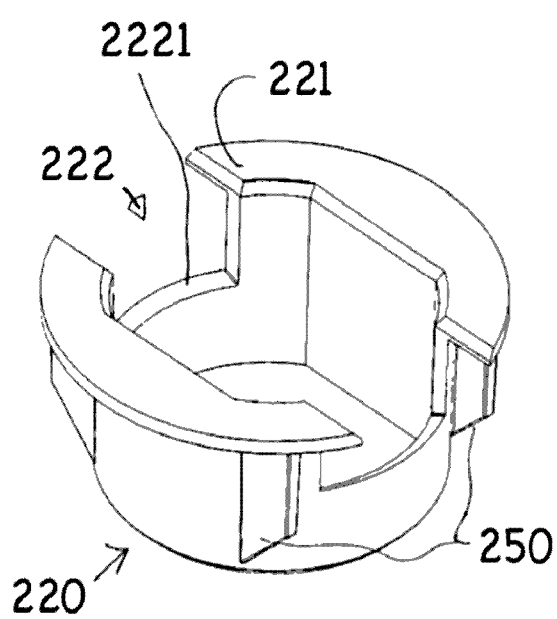
Figure 15:
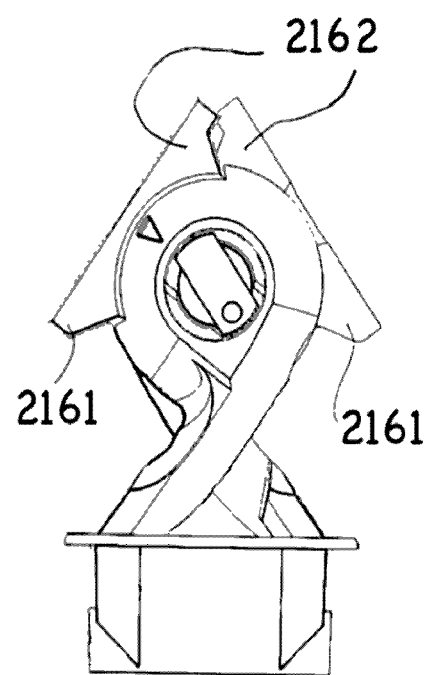
Figure 16:
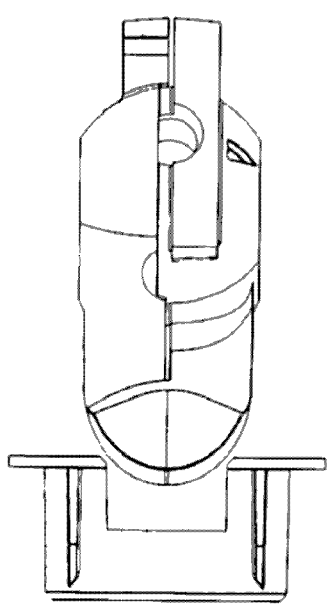
Figure 17:
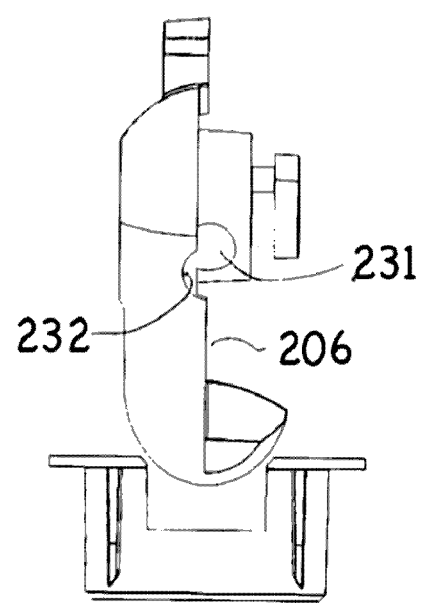
Figure 18:
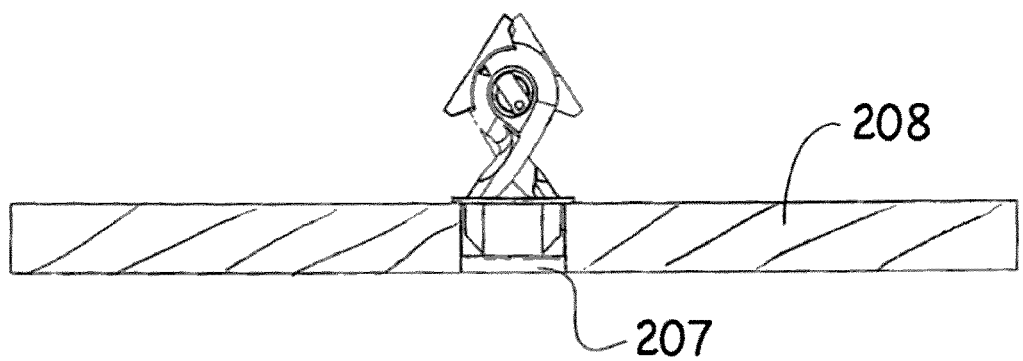
Figure 19:
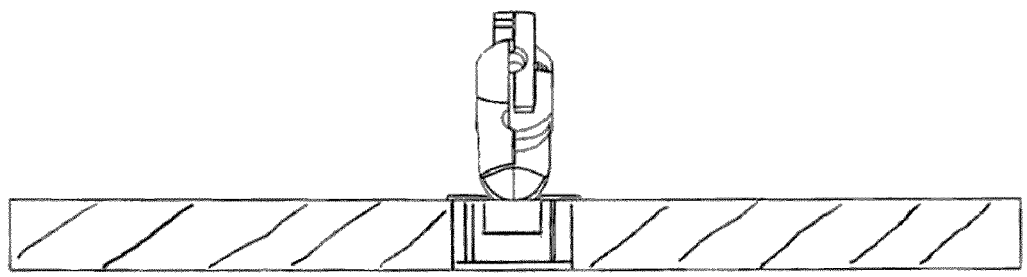
Figure 20:
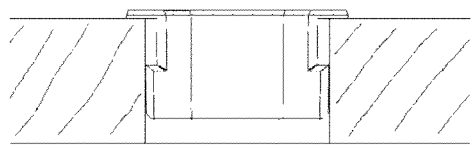
Figure 21:
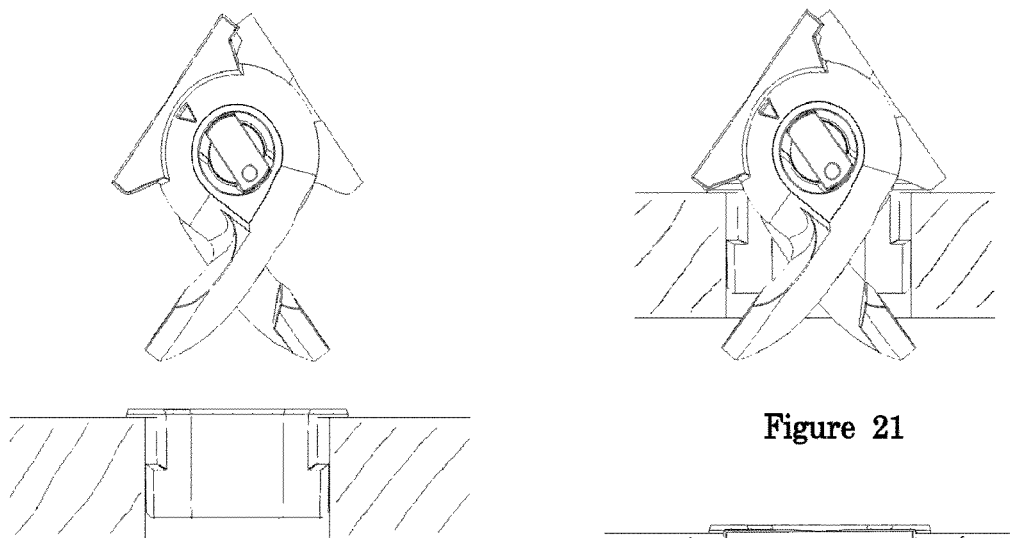
Figure 22:
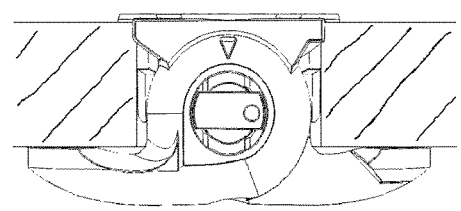
Figure 23:
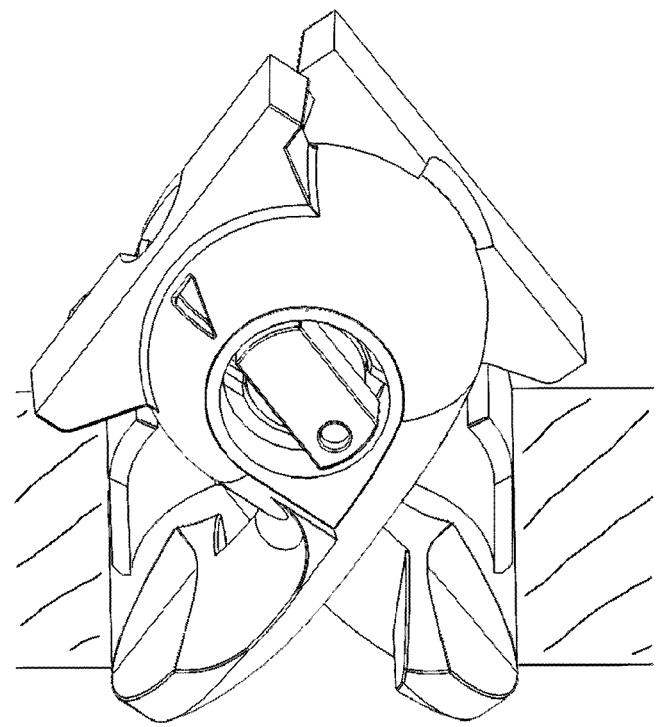
Figure 24:
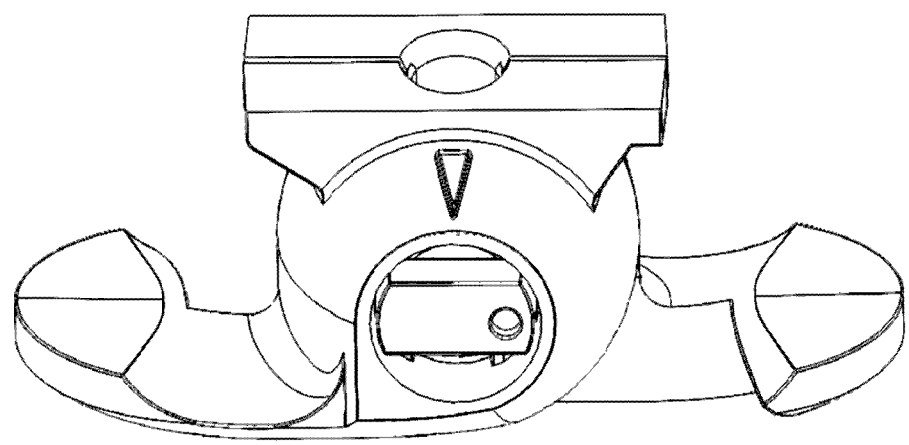
Figure 25:
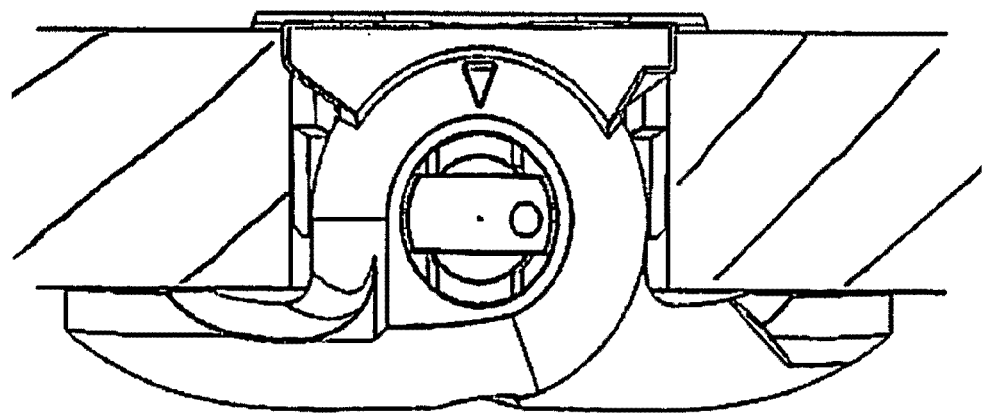
Figure 26:
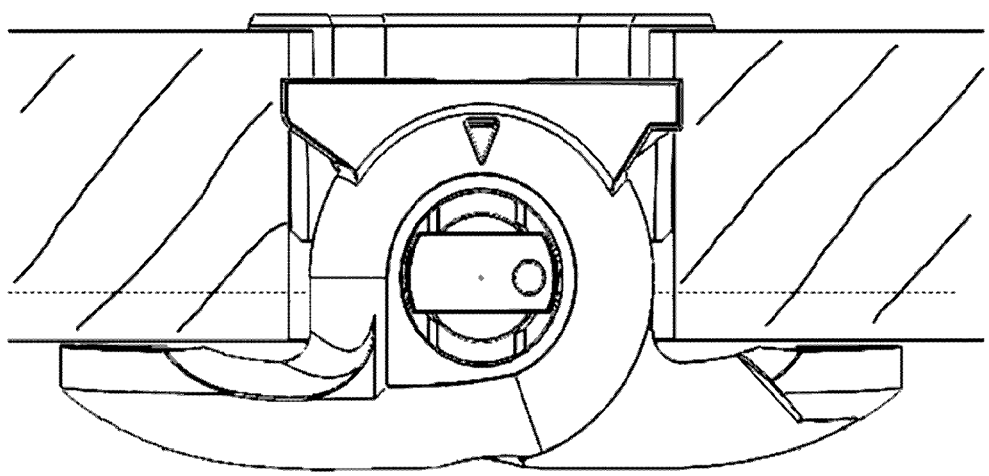
Figure 27:
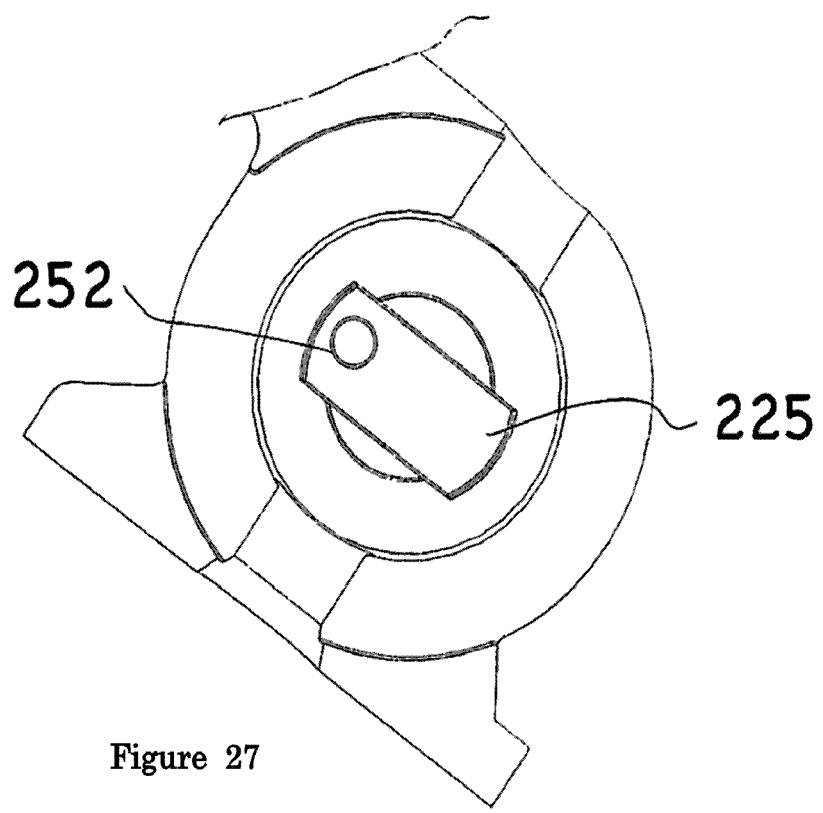
Figure 28:
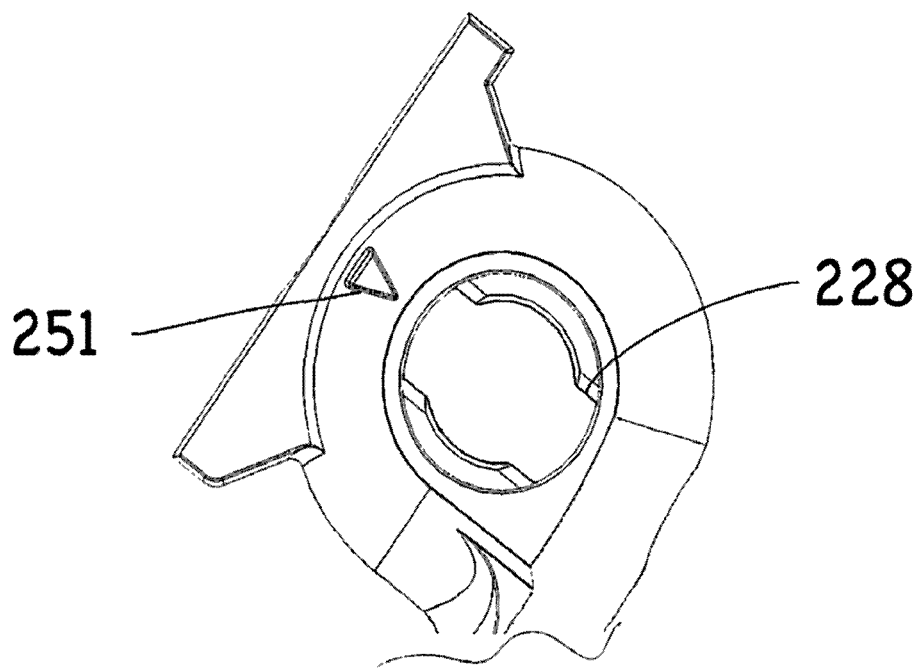

To help understanding of the invention, specific embodiments thereof will now be described by way of example and with reference to the accompanying drawings, in which:

FIG. 1 shows a side view of the fixing with a picture hook attached in a plasterboard, FIG. 2 illustrates a part cross-section of the fixing device fully contracted been inserted into a cavity with the aid of a tool with a flat surface, FIG. 3 shows an exploded view of the fixing with a picture hook with a sphere formed hub, FIG. 4 shows an exploded view of the fixing with a picture hook with a cylinder formed hub and star shaped aperture to accommodate a standard wood screw, FIG. 5 shows a cross sectional view of the fixing with a picture hook attached in plasterboard, FIG. 6 shows a rear view of the fixing expanded in plasterboard, FIG. 7 shows a variant of the fixing device of FIG. 1, FIG. 8 shows another variant of the fixing device of FIG. 1, FIG. 9 shows an optional sleeve that can be inserted into a pre-made hole in plasterboard first to evenly distribute loading, FIG. 10 is an exploded perspective view of another embodiment of fixing device according to the invention, FIG. 11 is a view similar to FIG. 10 from the other side and end of the fixing, FIG. 12 is a side view of the fixing of FIG. 10 being inserted in an aperture in a plaster board, FIG. 13 is a similar side view of the fixing with its fingers rotated and a fastener inserted in it and tightened, FIG. 14 is a perspective view of a sleeve for use in a variant of the embodiment of FIG. 10, FIG. 15 is a front view of the distal portions of the fingers of the variant aligned to be inserted in the sleeve, FIG. 16 is a side view of the components as aligned in FIG. 15, FIG. 17 is a view similar to FIG. 16, with one of the fingers omitted to show the pivot pin of the other finger, FIG. 18 is a view corresponding to FIG. 15 with the sleeve in a board, FIG. 19 FIG. 19 is likewise a view corresponding to FIG. 16, FIG. 20 is a view similar to FIG. 18, prior to insertion of the fingers into the sleeve, FIG. 21 is a corresponding view with the distal portions of the fingers emerging from the sleeve on the back side of the board and the proximal portions about to be inserted, FIG. 22 is another corresponding view of the fixing device fully assembled to a board, FIG. 23 is a larger perspective view of the fixing device during insertion, FIG. 24 is a similar view of the fingers only in their inserted position, FIG. 25 is a larger view of the view of FIG. 22 with the device in a relatively thin board, FIG. 26 is a similar view of the device in a relatively thicker board, with its lugs and abutment formation below the front face of the board and FIG. 27 shows a front view of the proximal end only of one of the fingers of the variant fixing device, and FIG. 28 shows a front view of the proximal end only of the other of the fingers of the variant fixing device.

With reference to FIGS. 1 to 6 a first embodiment of the invention will be described. It has increased speed of installation utilising the simultaneous insertion of two 90 degree fingers 5a, 5b rather than sequential insertion of two fingers. The embodiment contains two opposing rotational 90 degree fingers 5a, 5b having a hole 14 in one finger to accommodate a central hub 6 attached to the other finger that are allowed to contra-rotate freely around each other and can be held together by a plurality of non-returning barbed push-fit fingers 13 formed at the end of the hub 6. Other means of holding the fingers can be envisaged such as a retaining screw and washer could be used or a plastic retaining welded washer to hold both fingers together but allow rotation. The hub 6 can be an integral part of one of the fingers 5a which allows a threaded hole 15 (FIG. 3) or star shaped aperture 16 (FIG. 4) within the hub 6 to align correctly when the fixing is installed and pressed with a mallet 11 (FIG. 2) into the pre-made hole 1 of the plasterboard 2. The fixing is in a closed contracted state in FIG. 2 during the process of been pressed into a pre-formed hole 1 in plasterboard 2 will simultaneously engage lugs 3a, 3b attached to the fingers 5a, 5b with the front surface of the plasterboard 17 to cause the rotation of the 90 degree fingers 5a, 5b that will travel simultaneously axially and radially following a curved trajectory path 18 slightly past the rear of the plasterboard 7 but much greater than the diameter of the pre-made hole 1. The fingers 5a, 5b travel only a short distance axially past the rear of the plasterboard 7 making it suitable for where there is only a small cavity 14 between the rear of the plasterboard 2 and the wall structure 12 (FIG. 2). The fixing embodiment utilises the maximum space within the plasterboard thickness to allow the fingers 5a, 5b to start mechanically expanding 18 as it's pressed into the pre-made hole 1 from opposing sides of the pre-made hole 1 on surface 17. The fingers are shaped in such a way as to allow only a small protrusion of the fingers 5a, 5b past the rear of the plasterboard 7 as they follow a curved trajectory 18 at any one time and then lock behind the rear of the plasterboard surface 7 as the flat side of the fingers 19 meets parallel to the rear of the plasterboard surface 7. Two further lugs 4a, 4b on the fingers 5a, 5b engage with the plasterboard front surface 17 when fully expanded to stop the fingers 5a, 5b travelling straight through the plasterboard front surface 17. These lugs 4a, 4b also prevent rotation of the fixing radially when tightening of a bolt 8 or screw 5b into the fixing by biting into the plasterboard 2 front surface 17.

The fixing dimensions would be made to fit various thicknesses of plasterboard 2 as there are only a small number of standard plasterboard thickness sizes on the market worldwide. The fixing can also be made to suit a wide range of sizes of pre-made fixing holes 1. The fixing is further strengthened when a bolt 8 or screw 5b is used to attach an object such as a picture hook 9 to the fixing and tightened between the fingers 5a, 5b and through the central hub 6. This is achieved using semi-circular groves 10 which are formed within the fingers 5a, 5b to accommodate the bolt 8 or a screw 5b fixing to a tight tolerance as it travels towards and exits the hub 6. This mechanically locks all the parts together in its fully expanded form and prevents any further rotational path 18 of the fingers 5a, 5b.

The fixing is a low part count fixing that can be made from predominately moulded plastic, formed metal or resin but is not restricted to such materials and can be a combination of all materials. This fixing also travels only a short distance past the rear of the plasterboard 7 making it suitable for where there is only a small cavity 14 behind the rear of the plasterboard 7. The fixing utilises the pre-made hole 1 void within the plasterboard thickness to allow it to start mechanically expanding as it's pressed into the pre-made hole 1.

The fixing incorporates near maximum permitted surface area that it can utilise for expansion when it changes from a contracted state travelling through the hole (FIG. 2) to its fully expanded state as shown in the rear view of the fixing (FIG. 6).

As shown in FIG. 7 the fixing device can be varied to have partially hollow 90 degree finger with a smaller solid 90 degree finger that travels internally in opposite direction that are inserted into the hole sequentially and that locked together with a bolt or screw.

As shown in FIG. 8 a further variant has a larger central finger and then two adjoining opposing fingers that are inserted into the hole sequentially and locked together with a bolt or screw.

An optional additional sleeve lining 20 (FIG. 9) made from plastic, metal or resin can be introduced into a slightly larger designated pre-made hole 1 within the plasterboard 2 which allows for more evenly distributed loading within the pre-made hole laterally into the plasterboard 2 substrate from the fixing embodiment fingers 5a, 5b which is are not perfectly round. The sleeve 20 can be made to accommodate the lugs 4a, 4b, 5a, 5b with a recess 22 as so not to interfere with the rotational locking of the fixing when these bite into the front surface of the plasterboard 17. The sleeve lining 20 would also contain a lip 21 of low profile but larger than the pre-made hole 1 diameter to stop the sleeve 20 lining travelling straight through the plasterboard front surface 17 when fitted. This can be optionally introduced first into the pre-made hole 1 before the fixing embodiment is inserted or be attached to the fixing embodiment permanently as part of the design and introduced into the hole with the fixing simultaneously.

Referring to FIGS. 10 to 13, a fixing device 101 thereshown has a pair of complementary fingers 102,103. They are identical except for their complementary pivot formations 121,122. Their identical features will be described first, in the singular. Each has distal portion 104 and a proximal portion 105. Both have a flat surface 106, which abuts the same face in the other finger, both at the distal portions when the fixing is arranged for insertion in an aperture 107 in a board 108 and at the proximal portions when the fingers are arranged both for insertion and gripping of the board.

The distal portions are L-shaped in cross-section through much of their extent from the proximal portion, with one flange 109 having the surface 106 and another flange 110 at right angles. It has a surface 111 with an edge 1112 common with the surface 106. This surface 111 comes into abutment with the back face 112 of the board 108. At its very end 113, the distal portion has a T-shaped cross-section, with a projection 114 beyond the surface 106. This configuration increases the surface area at the end 113 available to abut the board face 112. The flanges 109,110 and the projection 114 taper in a curved manner from the proximal portion to the very end, with the very end shaped to enable passage through the aperture, when the fingers are in their insertion arrangement—shown in FIG. 12. Immediately at the proximal portion, the surface 111 is relieved in case of burrs at the back face of the aperture 107.

The proximal portion is generally hemispherical to allow rotation within the aperture 107. It has a lug and abutment formation 115 generally parallel to the surface 111. A lug portion 1161 of the formation projects generally in the direction of the distal portion 104. The formation has an outside—in use—surface 117 parallel with the surface 111 and spaced from it by the thickness T of the board 108. At the lug portion of the formation 115, it is angled back 118 towards the hemisphere 119 of the proximal portion. Directed away from the distal portion 104, an abutment portion 1162 of the formation is generally similar at the other end of the surface 117, except that it has an angular relief 120.

The function of these features will be described following description of the pivot formations 121,122. These are complementary male and female formations. The male one 121 has a boss 123, extending from the face 106. The boss has a pin 124 extending from it and the pin has a cross bar 125 at its end. The complementary female formations 122 are a recess 126, a bore 127 and a slot 128. The finger 103 has a face 129 parallel to the face 106 for the cross bar to move over, keeping the fingers engaged. The face 129 is itself recessed to enable the cross bar to be within the outline of the sphere defined by the two hemispheres when engaged together.

For a fastener 130, the boss has a bore 131 and recesses 132 above and below to enable the fastener to access the bore, the axis of the bore being in the plane of the surface 106 and normal to the surface 111. The complementary finger needs only the complementary recesses 134.

With the fingers engaged and their distal portions brought as close to alignment as possible, the Tee projections 114 abut the flanges 109 at angled faces 135. The contours of the fingers are such that they can be inserted into the aperture 107 until the distal portions 104 enter the aperture. Passage of these through the aperture is inhibited by the lugs 1161, specifically by abutment of the angled back surface 118. Pressure on the angular relief surfaces 120 of the abutments 1162 urges the lugs into the front face of the board 108. The reaction of the board acts about the pivot centrally of the aperture, tending to turn the fingers about the lugs under the constraint that they are pivoted together. As proximal portions are pushed or tapped into the aperture, the lugs dig more firmly into the board, which is typically plasterboard with the fingers being moulded of plastics material, typically polypropylene. Fingers are turned by this action with the distal portions coming to lie on the backside of the board. This allows the fastener 130, typically a self-tapping screw to be inserted between the complementary recesses 134, where they open in the outer surfaces 117.

If the fingers are not fully rotated, the fastener will assist in this as it enters the recesses. As it is wound in, it engages in the bore 131. Typically, the fixing and the fastener will be bracket 136 or the like with a face 137 to be drawn against the front face of the board. Tightening of the fastener urges the face 137 against the formation 115, in particular its surface 117 on the abutment side 1162 of the fastener opposite from the lug 1161. At this stage in the fastening, the fingers cannot come back out of the aperture, being located at the back face of the board by the root of the distal portion and at the front face by the lugs 1161. Drawing of face of the bracket and the faces of the distal portions by the fastener will have the effect of straightening the faces 117 against the bracket face 137, with final rotation of the very ends of the distal portions against the back of the body. Thus the fixing is complete.

In a variant of the embodiment of FIGS. 10 to 13, shown in FIGS. 14 to 26, a sleeve 220 similar to that shown in FIG. 9 is provided to line the aperture 207 in the board 208. It has a lip 221 limiting its movement into the bore and external ribs 250 for engaging in the material of the board around the aperture. The lugs 2161 and then the abutments 2162 of the fixing device 201 engage in openings 222 extending from the lip part way along the sleeve. The arrangement provides enhanced torsional resistance to turning of the entire device when a fastener such as 130 is engaged in the bore 231 for making a fixture.

With normal thickness of board, the lugs and abutments finish flush with the front 2081 of the board when the fixing is made with the fingers engaging the back of the board. This is shown in FIG. 25.

When the board is thicker, the assembly of the fingers needs to be inserted further into the board and the sleeve. This is achieved with a mallet, as the lugs and abutments forced a few millimetres below the front face of the board. To ensure rotation of the fingers, the openings 222 are provided with bottoms 2221 at a position to be engaged by the lugs 2161 for rotating of the fingers as described above. The lugs need project only a few millimetres into the board material, so that they do not provide significant resistance to insertion of the device with a mallet.

Should the fingers still not be fully rotated to abut the back of the board, the grooves 232 in the diametric faces 206 of the proximal portions of the fingers are more than likely to be aligned sufficiently for the point of a fastening screw such as 130 to be started in the grooves and led into the bore 231. Once the screw has reached the inner grooves 232, the fingers will be close to, if not already, being fully in their abutting orientation. Driving the screw into the grooves 232 will complete this process. The article to be secured may still be lose on the screw. Final tightening of the screw will be against the abutment of the distal portions of the fixing device on the back of the board and will draw the article against the front of the board. For this thicker board, there will remain a gap inside the sleeve between the lugs 2161 and abutments 2162 and the article. This will not detract from the fixing of the article in place against the board.

On further detail should be noted with reference to FIG. 27. The two proximal portions are shown, with their cross bar 225 and slot 228 aligned parallel in the Figure, though offset. The crossbar is parallel with the surface 217 and the slot 228 is normal to it. However these features are eccentric from centres of their proximal portions, as can be seen in the Figure, whereby the fingers can only be assembled in the correct relative orientation. This is indicated by the arrow 251 and the dot 252 moulded into the fingers. The arrow is set to point to the dot for assembly of the fingers together.

The invention claimed is:
1. A fixing device comprising:
   a first finger having a first distal portion including a first surface, a first proximal portion including a first lug and a first central surface;
   a second finger having a second distal portion including a second surface, a second proximal portion including a second lug and a second central surface;
   wherein the first central surface and second central surface are complementary surfaces;
   wherein the first and second fingers are connected at the first and second central surfaces to form a pivot axis about which the first and second fingers are contra-rotatable; and
   wherein the fixing device can adopt an insertion arrangement and an expanded arrangement,
   wherein in the expanded arrangement, a fastener receptacle is provided perpendicularly through the pivot axis for receiving a fastener whereby fastener engagement with walls defining the receptacle blocks rotation back toward the insertion arrangement.
2. A fixing device as claimed in claim 1, wherein, the first central surface includes a first semi-circular groove and the second central surface includes a second semi-circular second groove.
3. A fixing device as claimed in claim 2, wherein in the expanded arrangement, the first and second semi-circular grooves align to form the fastener receptacle.
4. A fixing device as claimed in claim 3, wherein the fastener receptacle is a threaded hole or a star shaped aperture.
5. A fixing device as claimed in claim 1, wherein the first central surface includes a central diametric surface comprising the fastener receptacle, the first proximal portion includes a first semi-circular groove, and the second proximal portion includes a second semi-circular groove.
6. A fixing device as claimed in claim 5, wherein in the expanded arrangement, the first and second semi-circular grooves align with the fastener receptacle to permit receiving of the fastener.
7. A fixing device as claimed in claim 6, wherein the fastener receptacle is a threaded hole or a star shaped aperture.

8. A fixing device as claimed in claim 1, wherein the first central surface comprises a boss extending perpendicular from the first central surface, the boss including a pin and a cross bar.

9. A fixing device as claimed in claim 8, wherein the second central surface comprises a recess configured to receive the boss, the recess including a bore, and a slot, the bore sized to receive the pin and the slot configured to receive the cross bar.

10. A fixing device as claimed in claim 1, wherein the first central surface comprises a central hub extending perpendicular from the first central surface.

11. A fixing device as claimed in claim 10, wherein the second central surface comprises a hole configured to receive the boss.

12. A fixing device as claimed in claim 1, wherein the first finger opposes the second finger by 90 degrees.

13. A fixing device as claimed in claim 1, wherein the first and second fingers can each contra-rotate by 90 degrees.

14. A fixing device as claimed in claim 13, wherein in the insertion arrangement, the first and second distal portions are rotated in close alignment to each other.

15. A fixing device as claimed in claim 1, wherein in the expanded arrangement, the first and second distal portions are rotated away from each other.

16. A fixing device as claimed in claim 1, wherein the first finger further includes a first abutment portion extending opposite from the first lug and in a direction away from the first distal portion and the second finger further includes a second abutment portion extending opposite from the second lug and in a direction away from the second distal portion.

17. A fixing device as claimed in claim 1, further comprising as a separate component a sleeve, the sleeve comprising a rim for abutting a front face of a board and preventing the sleeve from travelling through a pre-made hole in the board, one or more openings extending from an end of the sleeve, and/or one or more external ribs for engaging the pre-made hole in the board.

18. A fixing device as claimed in claim 1, further comprising a separate picture hook.

\* \* \* \* \*